United States Patent [19]

Swerdlow

[11] E Re. 29,569

[45] Reissued Mar. 7, 1978

[54] SPARE TRANSFORMER CONNECTING MEANS

[75] Inventor: Nathan Swerdlow, Philadelphia, Pa.

[73] Assignee: General Electric Company, Philadelphia, Pa.

[21] Appl. No.: 602,354

[22] Filed: Aug. 6, 1975

Related U.S. Patent Documents

Reissue of:

[64] Patent No.: 3,519,838
Issued: Jul. 7, 1970
Appl. No.: 794,049
Filed: Jan. 27, 1969

U.S. Applications:

[63] Continuation of Ser. No. 440,924, Feb. 8, 1974.

[51] Int. Cl.[2] ..... H02J 3/00

[52] U.S. Cl. ..... 307/17; 307/112

[58] Field of Search ..... 307/17, 23, 64, 70, 307/80, 83, 84, 85, 86, 87, 112, 147, 148

[56] References Cited

U.S. PATENT DOCUMENTS

| | | | |
|---|---|---|---|
| 2,229,531 | 1/1941 | Tornquist | 307/41 |
| 2,747,142 | 5/1956 | Kradel et al. | 307/112 X |
| 3,041,464 | 6/1962 | Pritchett | 307/112 X |

OTHER PUBLICATIONS

General Electric I.D. #ww 6389600, labeled Exhibit A, approximate date 1949 (System suppled to Pacific Gas & Electric Co. around 1949).

*Primary Examiner*—Herman Hohauser
*Attorney, Agent, or Firm*—William Freedman

[57] ABSTRACT

Discloses a power system in which three single phase transformers have their primary windings connected in delta to a 3-phase isolated phase bus. Switching means is provided for connecting a spare transformer to said bus as a replacement for any one of said single phase transformers. Special interlocking means assures that the spare transformer is connected to the bus in the same manner as the transformer it replaces.

13 Claims, 7 Drawing Figures

INVENTOR:
NATHAN SWERDLOW

BY William Freedman
ATTORNEY

INVENTOR:
NATHAN SWERDLOW,
BY William Freedman
ATTORNEY

INVENTOR:
NATHAN SWERDLOW,
BY William Freedman
ATTORNEY

SPARE TRANSFORMER CONNECTING MEANS

Matter enclosed in heavy brackets [ ] appears in the original patent but forms no part of this reissue specification; matter printed in italics indicates the additions made by reissue.

*This is a continuation, of application Ser. No. 440,924, filed Feb. 8, 1974.*

BACKGROUND OF THE INVENTION

This invention relates to means for connecting a spare transformer to a 3-phase electric bus to provide for replacement of any one of three single phase transformers normally connected in delta to the bus.

It sometimes becomes necessary to replace one of the single phase transformers of such a system to permit repairs or other work to be performed on the transformer. The usual procedure for effecting this replacement is to disconnect and physically remove the deficient transformer and to physically move into the vacant location a spare transformer and then to connect the spare to the bus. Since these transformers can be quite massive, it will be apparent that this can be a time-consuming and expensive operation, particularly when it is realized that the power system must be shut down during this operation.

SUMMARY

An object of my invention is to provide means for reducing the time and expense involved in replacing a transformer in such a system.

Another object is to provide an arrangement that allows a spare transformer, without physical movement, to be used in replacing any one of the single phase transformers of two separate delta-connected transformer banks.

In one embodiment of my invention, each of these delta-connected transformer banks is connected to an isolated phase bus with forced-gas cooling means. Another object of my invention is to provide for the transformer replacement of the immediately-preceding paragraph without impairing the isolated phase relationship of the bus and without impairing the operation of the forced-gas cooling means.

In carrying out my invention in one form, I provide an electric power system that comprises: (1) two three-phase isolated phase buses, each comprising first, second, and third main bus bars, and (2) six single-phase transformers, three of which have their primary windings connected in delta to one of said buses and the other three of which have their primary windings connected in delta to the other of said buses. In combination with this system, I provide means for connecting a spare transformer to either of said buses as a replacement for any one of the three single-phase transformers connected thereto. This connecting means comprises first and second auxiliary bus bars respectively connected to the opposite terminals of the primary winding of the spare transformer. The connecting means further comprises six normally-open disconnect devices, the first two of which are respectively connected between said first auxiliary bus bar and the first of the main bus bars of said two buses, the second two of which are respectively connected between the first auxiliary bus bar and the second of the main bus bars of said two buses, and the third two of which are respectively electrically between said first auxiliary bus bar and the third of the main bus bars of the two buses. Six additional normally-open disconnect devices are provided and these are electrically located between the second of said auxiliary bus bars and the main bus bars in a manner corresponding to the first six of the normally-open disconnect devices. Replacement of any one of the single-phase transformers by said spare transformer is effected by opening the two normally-closed disconnect devices connecting the primary winding of said one single-phase transformer to a given pair of main bus bars and closing the two normally-open disconnect devices that, upon closing, connect the primary winding of said spare transformer to said given pair of main bus bars.

BRIEF DESCRIPTION OF DRAWINGS

For a better understanding of the invention, reference may be had to the following description taken in conjunction with the accompanying drawings, wherein.

DESCRIPTION OF PREFERRED EMBODIMENT

Figure 1:
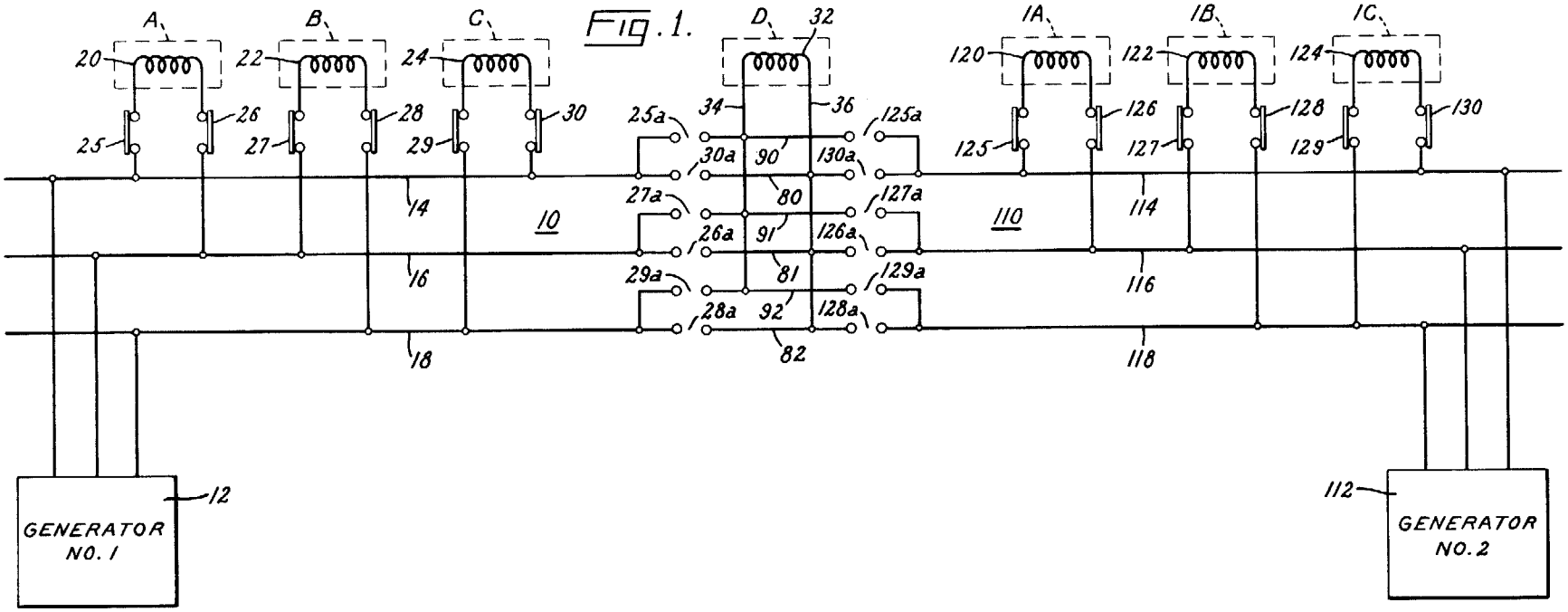
FIG. 1 is a schematic showing of an electric power system embodying one form of my invention.

Referring now to the schematic view of FIG. 1, there is shown a three-phase electric bus 10 that is supplied with alternating current by a three-phase generator 12. The bus 10 comprises three main bus bars 14, 16, and 18 which constitute the three phases of the bus. Connected in delta to the bus 10 are the primary windings 20, 22 and 24 of three single-phase transformers A, B and C. Winding 20 is normally connected between bus bars 14 and 16; winding 22 between bus bars 16 and 18; and winding 21 between bus bars 14 and 18. Each terminal of each of the primary windings is connected to its associated bus bar through a normally-closed disconnect device. These disconnect devices are respectively designated 25, 26, 27, 28, 29 and 30 in FIG. 1 and will be explained in greater detail hereinafter. To simplify the drawing, only the primary winding of each of the single-phase transformers is shown, it being understood, however, that the other usual components of the transformer are present, even though not shown.

It sometimes becomes necessary to replace one of the single-phase transformers to permit repairs or other work to be performed on it. To allow for such replacement, I have provided a spare single-phase transformer D having a primary winding 32. Connected to the opposite terminals of this winding 32 of the spare transformer D are a pair of spaced-apart auxiliary bus bars 34 and 36, portions of which extend perpendicular to the main bus bars. The first of the auxiliary bus bars 34 is adapted to be connected to any one of the main bus bars 14, 16 or 18 through normally-open disconnect devices 25a, 27a, 29a, which are respectively electrically located between the main bus bars 14, 16 and 18 and the first auxiliary bus bars 34. The other of the auxiliary bus bars 36 is adapted to be connected to any one of the main bus bars 14, 16 or 18 through another set of normally-open disconnect devices 30d, 26a and 28a which are respectively electrically located between the main bus bars 14, 16 and 18 and the second auxiliary bus bar 36.

When it is desired to replace the transformer A with spare transformer D, the normally-closed disconnect devices 25 and 26 associated with A are opened to disconnect the primary winding 20 of transformer A from the bus; and the normally-open disconnect devices 25a and 26a are closed to connect the primary winding 32 of the spare transformer to the bus across the same bus bars 14 and 16 as the winding 20 had been connected. Similarly, if the transformer B is the one which is being replaced with a spare, the normally-closed disconnect devices 27 and 28 are opened, and the normally-open disconnect devices 27a and 28a are closed. Or if the transformer C is the one which is being replaced by the spare, normally-closed disconnect devices 29 and 30 are opened, and normally-open disconnect devices 29a and 30a are closed. Thus, any one of the single-phase transformers can be replaced with the spare transformer simply by opening the two normally-closed disconnect devices associated with the original transformer and closing the appropriate pair of normally-open disconnect devices associated with the spare transformer, i.e., the pair of normally-open disconnect devices having corresponding reference numerals but the suffix "a".

Suitable interlock means, soon to be described, assures that the normally-closed disconnect device connected between a given one of said main bus bars and the terminal of the transformer winding connected thereto will be opened as a prerequisite to closing of the normally-open disconnect device located between said given bus bar and the corresponding polarity terminal of the spare transformer connected thereto upon said closing. In FIG. 1, the normally-closed disconnect device that must be opened as a prerequisite to the closing of a particular normally-open disconnect device has the same reference numeral as that particular normally-open disconnect device but without the suffix "a." For example, disconnect device 25 must be opened before 25a can be closed, disconnect device 26 must be opened before 26a can be closed; 27 must be opened before 27a can be closed, etc.

Although the above description of a transformer replacement operation is concerned primarily with changes in the connections of the transformer primary windings to the bus, it is to be understood that appropriate changes must also be made in the connections of the transformer secondary windings (not shown) to the transmission circuit (not shown). In this respect, the secondary winding of the transformer being replaced must be disconnected from the transmission circuit, and the secondary of the spare must be connected to the transmission circuit in its place. These changes in the secondary connections can be made in any suitable manner and are relatively easy to make since the secondary conductors are relatively small in cross-section and light in weight compared to the bus bars.

In the illustrated power system, I have illustrated an additional 3-phase bus 110 which is supplied by a separate generator 112. Connected to this bus in delta are the primary windings 120, 122 and 124 of three additional single phase transformers. The components associated with additional bus 110 correspond to and are interconnected in the same manner as those associated with bus 10, and they therefore have been assigned corresponding reference numerals except with the prefix "1." It is to be understood that these buses 10 and 110 are not intended to be electrically connected to each other.

One of the objects of my invention is to be able to use the spare transformer D as a replacement for any one of the transformers connected to either of the two buses. The above description explains how the spare can be used as a replacement for the transformers connected to the first bus 10. To permit use of the spare as a replacement for any one of the transformers connected to the other bus 110, I provide six additional normally-open disconnect devices 125a–130a, which correspond to the six normally-open disconnect devices 25a through 30a, respectively. An appropriate pair of these normally-open disconnect devices is closed to connect the spare to bus 110 as a replacement for any transformer 1A, 1B, or 1C which is disconnected therefrom. Each of these normally-open disconnect devices 125a–130a can be closed only after a correspondingly-designated normally-closed disconnect device 125–130 is opened, thus assuring that the spare transformer will be correctly connected to bus 110 when it is used as a replacement for a given transformer.

Since the disconnect devices 125a–130a are normally open, they serve to electrically isolate the bus 110 from bus 10 both when the system is in the condition shown in FIG. 1 and also when the spare transformer D is connected to left hand bus 10 through a pair of the disconnect devices in the group 25a–30a. If, on the other hand, the spare transformer D is being used as a replacement for any one of the transformers 1A, 1B, or 1C connected to the right hand bus 110, then the normally-open disconnect devices in the group 25a–30a electrically isolate the two buses from each other.

Referring now to FIGS. 2–6, the specific structural details of the various components will now be described. Each of the buses is of the isolated phase type, and as such, comprises three spaced-apart tubular metal housings 60 respectively surrounding the main bus bars. These metal housings 60 are at ground potential, and each is insulated from its enclosed bus bar by suitable insulators (not shown) disposed between the bus bar and the housing. This general type of bus is conventional and is described in detail and claimed in U.S. Reissue Pat. 26,233 Skeats, assigned to the assignee of the present invention.

INTERLOCK FEATURES

Figure 2:
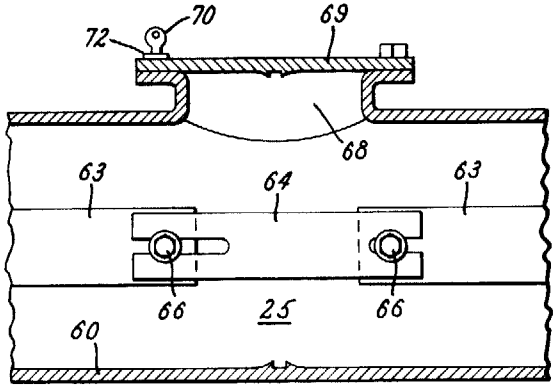
FIG. 2 is a sectional view of a portion of the system depicted in FIG. 1. This view depicts a disconnect device in its closed position.
Figure 3:
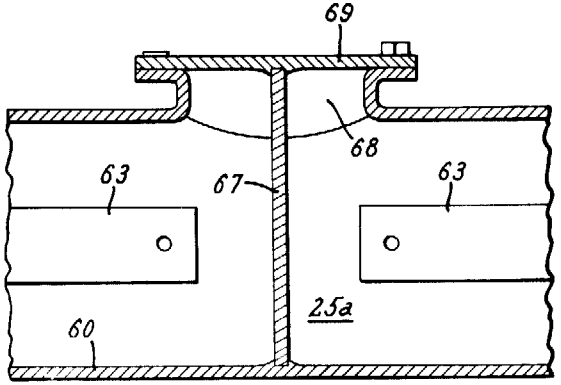
FIG. 3 is a sectional view similar to FIG. 2 except depicting the disconnect device in its open position.

Referring to FIG. 2, each of the disconnect devices, when in its closed condition, comprising a pair of spaced-apart terminal members 63 and a conductive disconnect link 64 bridging the terminal members and bolted at its opposite ends to the terminal members by suitable bolts 66. Opening of the disconnect device is effected by removing the bolts 66 and completely removing the disconnect link 64. Referring to FIG. 3, each of the normally-open disconnect devices is the same as the disconnect device shown in FIG. 2 except that the disconnect link 64 is absent. Closing of the normally-open disconnect device is effected by inserting a disconnect link 64 taken from one of the normally-closed disconnect devices between terminal members 63 and bolting it in place. In an open disconnect device, there is a removable grounded metal barrier 67 positioned between the two terminal members 63 in spaced relationship thereto. This barrier must, of course, be removed before the disconnect link 64 can be connected between the two terminal members 63.

Access to each of the disconnect devices to permit such opening or closing can be had through an access opening 68 in the tubular housing 60 disposed opposite the disconnect device. The access opening 68 is provided with a gasketed metal cover 69 detachably secured to the housing 60 and sealing the access opening against the entry of foreign matter. The cover 69 is bolted in place and also is held in place by a key-operated lock shown in FIG. 2 at 70. The key for operating the lock is shown at 72 in FIG. 2.

When the disconnect device of FIG. 2 is to be opened, the bolts holding cover 69 in place are removed and key 72 is operated to unlock lock 70, thus allowing the cover to be removed. The disconnect link 64 is then unbolted and is removed, along with the bolts 66, through the access opening 68.

The key 72 is then removed from the lock 70 and is used to unlock the cover of the particular normally open disconnect device corresponding in electrical location to normally-closed disconnect device which was just opened. As a specific example, the key associated with the cover of normally-closed disconnect device 25 of FIG. 1 will open the lock on the cover of the normally-open disconnect device 25a. Of the locks on all the covers, only the locks associated with disconnect devices 25 and 25a can be operated by this particular key. As another example, a separate key is provided for the cover associated with disconnect device 26, and only this lock and the lock associated with disconnect device 26a can be opened by this key. For each pair of interdependent disconnect devices, i.e., the devices having corresponding reference numerals differing only by the suffix "a," an individual key is provided, and this key will unlock only the covers associated with this particular pair of devices. This type of interlocking scheme is sometimes referred to as a Kirk lock system and is well known for interlocking access covers or doors, so as to require steps to be taken in accordance with a predetermined pattern.

Continuing now with the description of how normally-open disconnect device 25a of FIG. 3 is closed, the cover 69 adjacent thereto is removed, as above described, and the metal barrier 67 is then lifted out through the opening 68. The disconnect link from disconnect device 26 is then introduced through opening 68 and is bolted in place between the spaced terminals 63 of device 25a is Thereafter, the cover 69 associated with device 25a is again closed and locked with key 72. The key 72 is then removed for use in locking the cover 69 of device 25, as will soon be described.

The opening operation of normally-closed disconnect device 25 is completed by inserting the barrier 67 now removed from the disconnect device 25a into the now-open space between spaced terminals 63 of disconnect device 25. Thereafter, cover 69 of device 25 is placed over the associated access opening 68 and is locked in position by the key 72 returned from the disconnect device 25a.

Since the disconnect device 25a requires a disconnect link 64 from one of the normally-closed disconnect devices in order to be closed and since the only disconnect link available is from disconnect device 25 by virtue of the key interlock system, it will be apparent that opening of the normally-closed disconnect device 25 is a prerequisite to closing of the normally-open disconnect device 25a.

One function of the grounded metal barrier 67 is to interpose grounded metal structure between the two spaced-apart terminals 63 when it is desired to keep these parts electrically isolated, thus minimizing the possibility of an arc-over between these parts 63 and also forcing any arc-over that might possibly occur in this region to be to ground. Another function of the barrier 67 is to control the passage of cooling air along the bus bar, as will soon be explained.

STRUCTURE DEPICTED IN FIGS. 4–6

Figure 4:
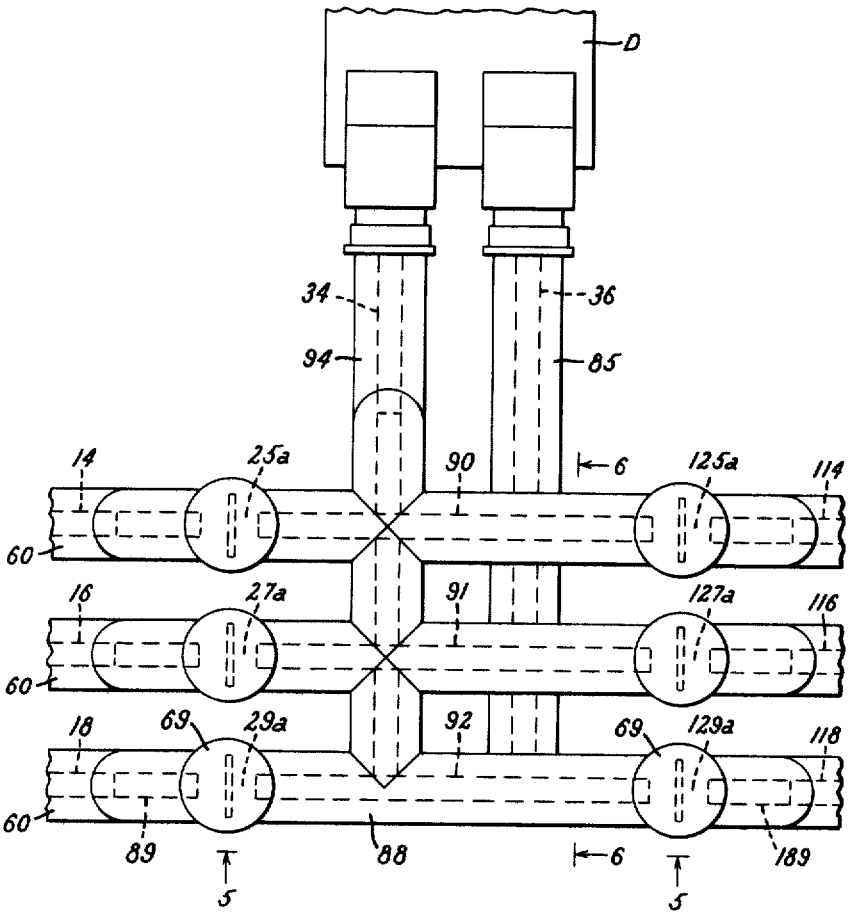
FIG. 4 is a plan view of a portion of the system of FIG. 1.
Figure 6:
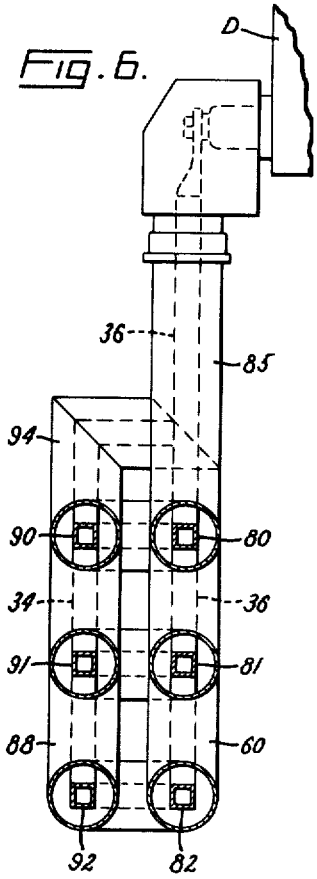
FIG. 6 is a sectional view along the line 6—6 of FIG. 4.
Figure 5:
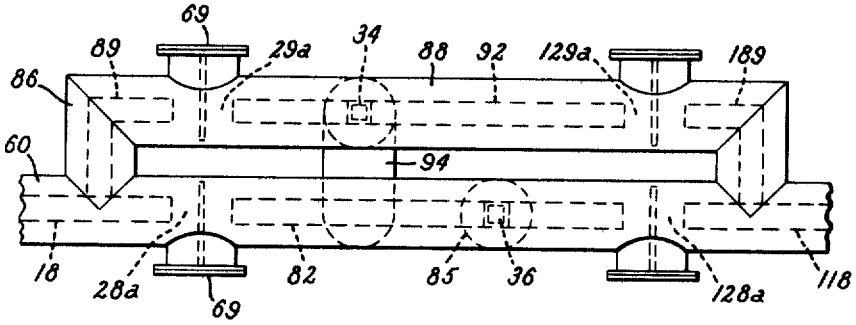
FIG. 5 is an end view of the structure of FIG. 4 looking in the direction of arrows 5 of FIG. 4.

FIGS. 4–6 provide a more detailed showing of the manner in which the bus is constructed in the region of the disconnect devices 25a–30a and 125–130a associated with the spare transformer. It will be seen in these figures that the main bus bar 18 is aligned with respect to the main bus bar 118 and that the particular metal housing 60 about these two main bus bars 18 and 118 extends continuously between the bus bars. Within the intermediate portion of housing 60 located between the two main bus bars 18 and 118, a section 82 of the auxiliary bus 36 is located in aligned relationship with respect to the main bus bars 18 and 118. The normally-open disconnect devices 28a and 128a are located within the intermediate portion of housing 60 and are accessible through covered access openings in the bottom of housing 60.

The two bus bars 16 and 116 are likewise disposed in aligned relationship, and the metal housing 60 surrounding these bus bars extends continuously between them. Within the intermediate portion of housing 60 between the two main bus bars 16, 116, a section 81 (FIGS. 1 and 6) of the auxiliary bus 36 is located in aligned relationship with the main bus bars 16 and 116. The normally-open disconnect devices 26a and 126a (FIG. 1) are located within the intermediate portion of this particular housing 60.

Substantially the same construction is present between the main bus bars 14 and 114. The auxiliary bus 36 has a section 80 (FIGS. 1 and 6) disposed in alignment with bus bars 14 and 114 and enclosed by the intermediate portion of the associated housing 60. Within the intermediate portion of this housing 60 are the two normally open disconnect devices 30a and 130a (FIG. 1).

The portion of the auxiliary bus 36 which extends perpendicular to the main bus bars is enclosed by a tubular metal housing 85. Sections of this tubular housing 85 are disposed about this perpendicular portion of auxiliary bus 36 in coaxial relationship thereto and are suitably welded to housings 60. The housings 60 have openings in their sides aligned with the sections of tubular housing 85 to allow the perpendicular portion of the auxiliary bus 36 to pass through the housing 60 and join to the intermediate section 80, 81, or 82, as the case may be.

For enclosing the normally-open disconnect devices 25a, 27a, 29a, 125a, 127a, and 129a associated with the other auxiliary bus bar 34, each of the tubular housings 60 is provided with a tubular appendage 86, 88 of an inverter U-form, as viewed in FIG. 5. Each of these appendages comprises a pair of spaced-apart tubular sections 86 extending vertically upward from the tubular housing 60 and a horizontally-extending additional section 88 connected between the upper ends of these vertically extending tubular sections 86. A bus bar section 89 of inverted L-form extends from bus bar 18 through one of the vertical sections 86 and a short distance along the axis of horizontal section 88. A similar bus bar section 189 of inverted L-form extends from the bus bar 118 and along a portion of the length of the U-shaped appendage 86, 88 at its opposite end.

Between the aligned upper arms of the two L-shaped sections 89 and 189 of bus bars 18 and 118 an intermediate section 92 of the auxiliary bus 34 is disposed in alignment with the arms of section 89 and 189. The normally-open disconnect device 29a is located between bus bar section 89 and auxiliary bus section 92; and the normally-open disconnect device 129a is located between the other bus bar section 189 and auxiliary bus section 92. Suitable openings the tubular housing 88 aligned with the disconnect device 29a and 129a afford access thereto when the gasketed covers associated therewith are removed.

The auxiliary bus bar 34 has similar intermediate sections 90 and 91 associated in substantially the same manner with the remaining bus bars 14, 114 and 16, 116, respectively, as will be apparent from the schematic view of FIG. 1. Similarly, the U-shaped appendage 86, 88 associated with each of the remaining housings 60 surrounds the associated intermediate section 90 or 91 of the auxiliary bus bar 34 and the associated L-shaped conductors 89, 189 at its opposite ends in the same manner as illustrated in FIG. 5.

The section of the auxiliary bus 34 that extends perpendicular to intermediate sections 90, 91, 92 is surrounded by a housing portion 94, as viewed in FIGS. 4 and 6. This housing portion 94 is shown located above the main tubular housing 60 and in the same plane as horizontal sections 88 of the U-shaped appendages 86, 88.

COOLANT CONTROL

For cooling the illustrated buses, I force air or some other suitable coolant to flow through each of the tubular housings 60 from the generator to the connected transformer where it is suitably exhausted. The barriers 67 serve the added function of preventing any such coolant from being wasted by passage to a transformer that might be disconnected from the bus, in which case no coolant would be needed for its leads. For example, when the spare tranformer D is disconnected from the bus, the barriers associated with the six normally-open disconnect devices 25a–30a prevent any substantial volume of the coolant from passing into housings 94 and 85 leading to the spare transformer D. Should, however, the spare transformer be connected to the bus, say as a replacement for transformer A, the coolant would be allowed to flow past then-closed disconnect devices 25a and 26a, thus entering the housings 94, 85 leading to the spare transformer D. No coolant would, however, be diverted to the then-disconnected leads to transformer A since the barriers 67 would then be present at 25 and 26 to block such flow.

It is to be noted that the isolated phase relationship of our bus bars is maintained irrespective of whether or not the spare transformer D is connected to the bus. In this respect, note that whether or not spare transformer D is connected to the bus, each phase conductor is surrounded by a grounded metal housing throughout its length extending from the generator to a connected transformer. Even at the open disconnect devices connected thereto, there is always a grounded metal barrier interposed between the phase conductor and any of the other phase conductors.

MODIFIED EMBODIMENT

Figure 7:
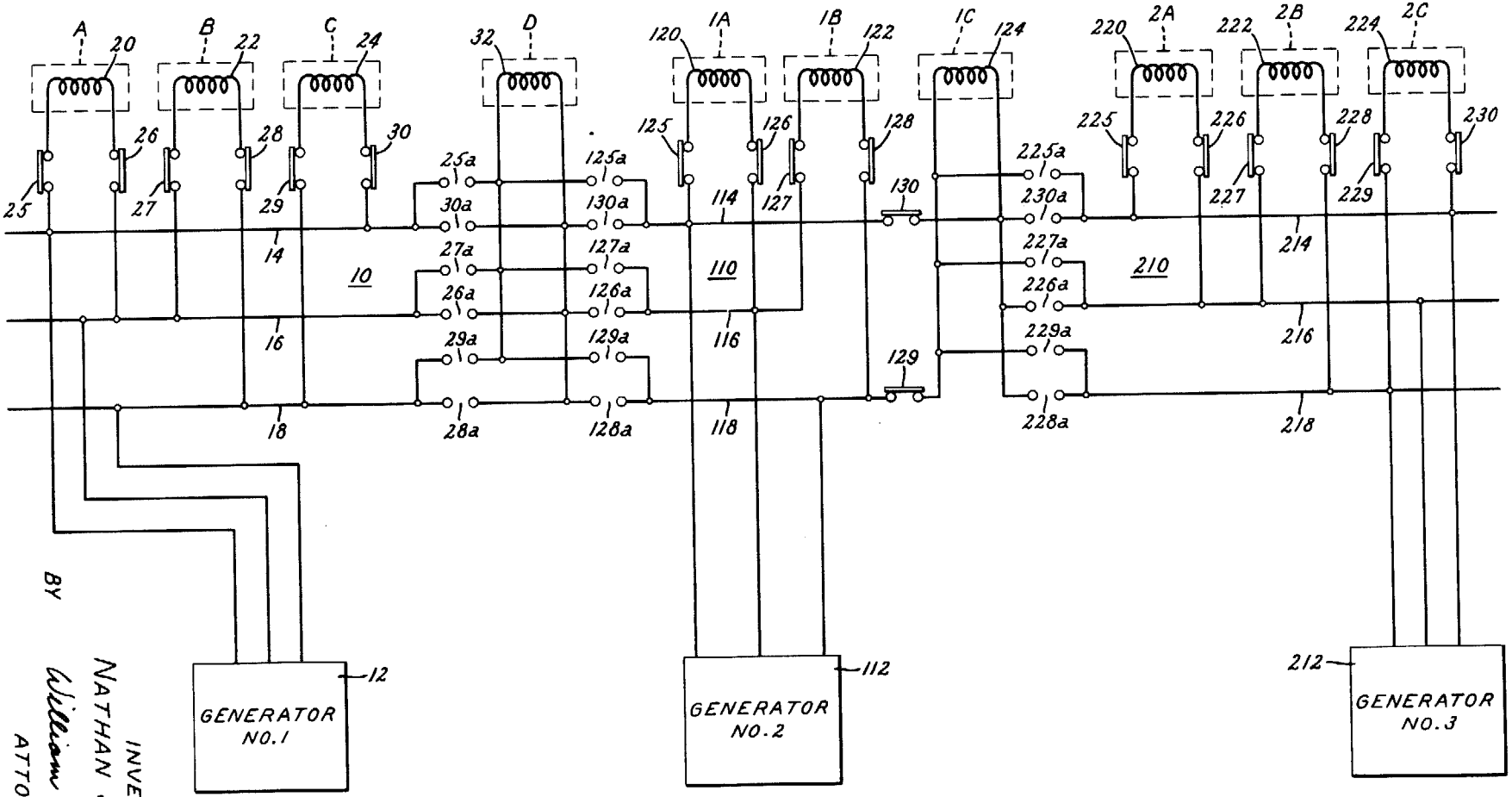
FIG. 7 is a schematic showing of an electric power system embodying a modified form of my invention.

FIG. 7 is a schematic illustration of a power system with three separate buses, each having three single phase transformers connected in delta thereto. With the switching arrangement illustrated, even though only a single spare transformer is available, I could readily provide a replacement for any one of the nine normally-connected transformers present therein should it be necessary to remove one of these nine transformers.

This system of FIG. 7 is substantially the same as that of FIG. 1 except that a third bus 210 is present adjacent the second bus 110. The third bus and the components associated therewith have been assigned the same reference numerals as corresponding components associated with bus 10 except that the prefix "2" has been used before each reference numeral associated with bus 210.

If any one of the six transformers A, B, C, 1A, 1B, or 1C should require replacement, it is disconnected from its bus and replaced by the spare transformer D in exactly the same manner as described with respect to FIG. 1.

If, on the other hand, one of the remaining transformers 2A, 2B, or 2C should require replacement, this replacement is effected by disconnecting adjacent transformer 1C from its bus 110 and connecting it to bus 210 in place of the deficient transformer. The spare transformer D is then used as a replacement for transformer 1C, which is no longer connected to bus 110.

To replace any one of the transformers 2A, 2B, or 2C, the two normally-closed disconnect devices in its terminals are opened and the correspondingly numbered (with suffix "a") normally-open disconnect devices associated with the tranformer 1C are closed. Key interlock means, such as already described, interlocks the disconnect devices in such a manner that any given "a" devices can be closed only after the correspondingly numbered device without the "a" is opened. For example, normally-open disconnect device 225a can be closed only after normally-closed disconnect device 225 is opened; 226a can be closed only after 226 is opened; etc. Thus, if tranformer 2B is to be replaced by transformer 1C, normally-closed disconnect devices 227 and 228 are opened to disconnect 2B from the buses 216, 218; and normally-open disconnect devices 227a and 228a are closed to connect transformer 1C across buses 216 and 218.

Since tranformer 1C is no longer available to use with the bus 110, it is disconnected therefrom by opening normally-closed disconnect devices 129 and 130, which also effectively isolates bus 110 from bus 210, as desired. The spare transformer D is used as a replacement for transformer 1C and is connected with the bus 110 by closing normally-open disconnect devices 129a and 130a following opening of 129 and 130 respectively. The three transformers A, B, and C in the first bank remain connected to their bus 10, which is isolated from bus 110 by the open disconnect devices 25a–30a. Thus, each of the three buses has its three transformers properly connected thereto and is electrically isolated from the other buses, as is desired.

It is to be understood that all the open disconnect devices of FIG. 7 have barriers 67 associated therewith in the manner disclosed in FIG. 3, and this barrier functions in the same manner as described hereinabove. One of its functions, as described hereinabove, is to prevent the passage of cooling gas past an open disconnect device.

It is to be further undertood that my invention in its broader aspects comprehends the use of my interlocking arrangement and my coolant control arrangement in bus switching systems other than those specifically described and illustrated.

While I have shown and described particular embodiments of my invention, it will be obvious to those skilled in the art that various changes and modifications may be made without departing from the invention in its broader aspects; and I, therefore, intend in the appended claims to cover all such changes and modifications as fall within the true spirit and scope of my invention.

What I claim as new and desired to secure by letters Patent of the United States is:

[1. In an electric power system that comprises: (1) a three-phase isolated phase bus comprising first, second, and third main bus bars, (2) three single-phase transformers each having a primary winding with a pair of terminals, (3) a pair of normally-closed disconnect devices for each of said primary windings connecting said three primary windings in delta to said bus, the normally-closed disconnect devices of each pair being between the terminals of the associated primary winding and the main bus bars to which said terminals are respectively connected and (4) a spare transformer having a primary winding with a pair of terminals; means for connecting said spare transformer to said bus as a replacement for any one of said three single-phase transformers, comprising:

(a) first and second auxiliary bus bars respectively connected to the opposite terminals of the primary winding of said spare transformer, (b) three normally-open disconnect devices, the first being electrically connected between the first of said main bus bars and said first auxiliary bus bar, the second being electrically connected between the second of said main bus bars and said first auxiliary bus bar, and the third being electrically connected between the third of said main bus bars and said first auxiliary bus bar, (c) three additional normally-open disconnect devices, the first additional normally-open disconnect device being electrically connected between the first of said main bus bars and said second auxiliary bus bar, the second additional normally-open disconnect device being electrically connected between the second of said main bus bars and said second auxiliary bus bar, the third additional normally-open disconnect device being electrically connected between the third of said main bus bars and said second auxiliary bus bar, (d) replacement of any one of said single phase transformers by said spare being effected by opening the two normally-closed disconnect devices connecting said one single phase transformer to a given pair of main bus bars and closing the two normally-open disconnect devices that, upon closing, connect the spare to said given pair of main bus bars, and (e) interlock means requiring (i) opening of the normally-closed disconnect device connected between a given one of said main bus bars and the terminal connected thereto of the single phase transformer that is being replaced, as a requisite to (ii) the closing of the normally-open disconnect device located between said given bus bar and the corresponding polarity terminal of the spare transformer connected thereto upon said closing.]

[2. In an electric power system that comprises (1) two three-phase isolated phase buses, each comprising first, second and third main bus bars, (2) six single-phase transformers, each having a primary winding with a pair of terminals, (3) a pair of normally-closed disconnect devices for each of said primary windings connecting three of said windings in delta to one of said buses and the other three of said primary windings in delta to the other of said buses, the normally-closed disconnect devices of each pair being between the terminals of the associated primary winding and the main bus bars to which said terminals are respectively connected and (4) a spare transformer having a primary winding with a pair of terminals; means for connecting said spare transformer to either of said buses as a replacement for any one of the three single-phase transformers normally connected thereto, comprising:

(a) first and second auxiliary bus bars respectively connected to the opposite terminals of the primary winding of said spare transformer, (b) six normally-open disconnect devices, the first two of which are respectively electrically connected between said first auxiliary bus and the first of the main bus bars of said two buses, the second two of which are respectively electrically connected between said first auxiliary bus bar and the second of the main bus bars of said two buses, the third two of which are respectively electrically connected between said first auxiliary bus and the third of the main bus bars of said two buses, (c) six additional normally-open disconnect devices, the first two of which are respectively electrically between said second auxiliary bus bar and the first of the main bus bars of said two buses, the second two of which are respectively electrically between said second auxiliary bus bar and the second of the main bus bars of said two buses, the third two of which are respectively electrically between said second auxiliary bus bar and the third of the main bus bars of said two buses, (d) replacement of any one of said single-phase transformers by said spare transformer being effected by opening the two normally-closed disconnect devices connecting the primary winding of said one single-phase tranformer to a given pair of main bus bars and closing the two normally-open disconnect devices that, upon closing, connect the primary winding of said spare transformer to said given pair of main bus bars.]

[3. The arrangement of claim 2 in combination with interlock means requiring: (i) opening of the normally-closed disconnect device connected between a given one of said main bus bars and the terminal connected thereto of the single phase transformer that is being replaced, as a requisite to (ii) closing of the normally-open disconnect device located between said given main bus bar and the corresponding polarity terminal of the spare transformer connected thereto upon said closing.]

[4. The combination as defined in claim 1, in which:

(a) each of said normally-closed disconnect devices comprises a pair of spaced-apart terminal members and a removable disconnect link connected therebetween, said disconnect link being removable to effect opening of said normally-closed disconnect device, (b) and each of said normally-open disconnect devices comprises a pair of spaced-apart terminal members which are normally electrically isolated from each other but are adapted to receive therebetween a disconnect link taken from one of said normally-closed disconnect devices.]

5. [The combination as defined in claim 1 in further combination with:] *In an electric power system that comprises: (1) a three-phase isolated phase bus comprising first, second, and third main bus bars, (2) three single-phase transformers each having a primary winding with a pair of terminals, (3) a pair of normally-closed disconnect devices for each of said primary windings connecting said three primary windings in delta to said bus, the normally-closed disconnect devices of each pair being between the terminals of the associated primary winding and the main bus bars to which said terminals are respectively connected and (4) a spare transformer having a primary winding with a pair of terminals; means for connecting said spare transformer to said bus as a replacement for any one of said three single-phase trasnsformers, comprising:*

*(a) first and second auxiliary bus bars, respectively connected to the opposite terminals of the primary winding of said spare transformer,*

*(b) three normally-open disconnect devices, the first being electrically connected between the first of said main bus bars and said first auxiliary bus bar, the second being electrically connected between the second of said main bus bars and said first auxiliary bus bar, and the third being electrically connected between the third of said main bus bars and said first auxiliary bus bar,*

*(c) three additional normally-open disconnect devices, the first additional normally-open disconnect device being electrically connected between the first of said main bus bars and said second auxiliary bus bar, the second additional normally-open disconnect device being electrically between the second of said main bus bars and said second auxiliary bus bar, the third additional normally-open disconnect device being electrically between the third of said main bus bars and said second auxiliary bus bar,*

*(d) replacement of any one of said single phase transformers by said spare being effected by opening the two normally-closed disconnect devices connecting said one single phase transformer to a given pair of main bus bars and closing the two normally-open disconnect devices that, upon closing, connect the spare to said given pair of main bus bars, and*

*(e) interlock means requiring (i) opening of the normally-closed disconnect device connected between a given one of said main bus bars and the terminal connected thereto of the single phase transformer that is being replaced, as a requisite to (ii) the closing of the normally-open disconnect device located between said given bus bar and the corresponding polarity terminal of the spare transformer connected thereto upon said closing, and in further combination with the above-recited combination:*

[(a)] *(f)* a plurality of metal housings at ground potential respectively surrounding each of said main bus bars,

[(b)] *(g)* the metal housing surrounding a given bus bar also having a portion surrounding the disconnect devices connected thereto,

[(c)] *(h)* access openings in said housings respectively located opposite the disconnect devices therein,

[(d)] *(i)* covers for each of said access openings,

[(e)] *(j)* locks for each of said covers normally locking said cover on its associated opening,

[(f)] *(k)* a key for each of the locks of a cover opposite a normally-closed disconnect device,

[(g)] *(l)* key interlock means preventing the key used for unlocking a cover opposite a given normally-closed disconnect device from unlocking any of the covers of said normally-open disconnect devices except the cover of the particular normally-open disconnect device which, upon closing, connects a spare transformer to the same bus bar as the bus bar to which said given normally-closed disconnect device connected its transformer terminal.

6. [The combination of claim 1 in which:] *In an electric power system that comprises: (1) a three-phase isolated phase bus comprising first, second, and third main bus bars, (2) three single-phase transformers each having a primary winding with a pair of terminals, (3) a pair of normally-closed disconnect devices for each of said primary windings connecting said three primary windings in delta to said bus, the normally-closed disconnect devices of each pair being between the terminals of the associated primary winding and the main bus bars to which said terminals are respectively connected and (4) a spare transformer having a primary winding with a pair of terminals; means for connecting said spare transformer to said bus as a replacement for any one of said three single-phase transformers, comprising:*

*(a) first and second auxiliary bus bars respectively connected to the opposite terminals of the primary winding of said spare transformer,*

*(b) three normally-open disconnect devices, the first being electrically connected between the first of said main bus bars and said first auxiliary bus bar, the second being electrically connected between the second of said main bus bars and said first auxiliary bus bar, and the third being electrically connected between the third of said main bus bars and said first auxiliary bus bar,*

*(c) three additional normally-open disconnect devices, the first additional normally-open disconnect device being electrically connected between the first of said main bus bars and said second auxiliary bus bar, the second additional normally-open disconnect device being electrically between the second of said main bus bars and said second auxiliary bus bar, the third additional normally-open disconnect device being electrically between the third of said main bus bars and said second auxiliary bus bar,*

*(d) replacement of any one of said single phase transformers by said spare being effected by opening the two normally-closed disconnect devices connecting said one single phase transformer to a given pair of main bus bars and closing the two normally-open disconnect devices that, upon closing, connect the spare to said given pair of main bus bars, and*

*(e) interlock means requiring (i) opening of the normally-closed disconnect device connected between a given one of said main bus bars and the terminal connected thereto of the single phase transformer that is being replaced, as a requisite to (ii) the closing of the normally-open disconnect device located between said given bus bar and the corresponding polarity terminal of the spare transformer connected thereto upon said closing,*

[(a)] *(f)* each of said normally-closed disconnect devices comprises a pair of spaced apart terminal members and a removable disconnect link connected therebetween, said disconnect link being removable to effect opening of said normally-closed disconnect device,

[(b)] *(g)* each of said normally-open disconnect devices comprises a pair of spaced-apart terminal members which are normally electrically isolated from each other but are adapted to receive therebetween a disconnect link taken from one of said normally-closed disconnect devices,

[(c)] *(h)* a removable barrier is present between the terminal members of each of said normally-open disconnect devices when open, said barrier being located in spaced-apart relationship to said terminal members,

[(d)] *(i)* said barrier requiring removal as a prerequisite to connection of a disconnect link between said terminal members during a closing operation of said normally-open disconnect device, and

[(e)] *(j)* said removed barrier fitting into the normally-closed disconnect device that has been opened to provide a disconnect link for said closing operation, said barrier upon being included in said normally-closed, but then-opened, disconnect device being spaced from the terminal members of said latter disconnect device.

[7. The electric power system of claim 2 in combination with:

(a) a third three phase bus comprising first, second and third main bus bars, (b) three additional single-phase transformers normally having their primary windings connected in delta to said third three-phase bus, (c) means for connecting the single-phase transformer of said power system located adjacent said third three-phase bus to said third three-phase bus as a replacement for any one of the additional single phase transformers normally connected to said third three-phase bus, comprising:

(i) three further normally-open disconnect devices respectively connected between one terminal of said adjacent transformer and said first, second and third main bus bars of said third bus, (ii) three still further normally-open disconnect devices respectively connected between the opposite terminal of said adjacent transformer and said first, second and third main bus bars of said third bus, (iii) a pair of normally-open disconnect devices for each of the single-phase transformers normally connected to said third bus respectively connected between terminals of said latter single phase transformer and the main bus bars to which said latter single phase transformer is connected, (iv) replacement of said latter single-phase transformer by said adjacent transformer being effected by opening the two normally-closed disconnect devices connecting said latter single-phase transformer to a given pair of main bus bars in said third bus and closing the two normally-open disconnect devices of those recited in (i) and (ii) that, upon closing, connect said spare transformer to said given pair of main bus bars in said third bus.]

8. The arrangement of claim [7] *26* in combination with: interlock means requiring opening of the normally-closed disconnect device connected between a given one of the main bus bars of said third bus and the terminal normally connected thereto of the single phase transformer being replaced as a requisite to the closing of the disconnect device located between said given bus bar of the third bus and the corresponding polarity terminal of said adjacent transformer connected thereto upon said closing.

[9. In an electric power system that comprises: (1) a three-phase isolated-phase bus comprising first, second and third bus bars, (2) three single-phase transformers each having a primary winding with a pair of terminals, (3) a pair of normally-closed disconnect devices for each of said primary windings connecting said three primary windings in delta to said bus, the normally-closed disconnect devices or each pair being between the terminals of the associated primary windings and the bus bars to which their terminals are respectively connected and, (4) a spare transformer having a primary winding with a pair of terminals, means for connecting said spare transformer to said bus when one of said three single-phase transformers is disconnected therefrom, comprising:

(a) six normally-open disconnect devices, the first two being electrically connected respectively between the terminals of said spare transformer and the first and third bus bars, the second two being electrically connected respectively between the terminals of one of said four transformers and the first and second of said bus bars, the third two being electrically connected respectively between the terminals of one of said four transformers and the second and third of said bus bars, (b) replacement of a disconnected transformer being effected by closing the two normally-open disconnect devices that, upon closing, connect the associated transformer to the same bus bars as said disconnected transformer was connected to.]

[10. In an electric power system that comprises (1) two three-phase isolated phase buses, each comprising first, second, and third bus bars, (2) six single-phase tranformers, each having a primary winding with a pair of terminals, (3) a pair of normally-closed disconnect devices for each of said primary windings connecting three of said windings in delta to one of said buses and the other three of said primary windings in delta to the other of said buses, the normally-closed disconnect devices of each pair being between the terminals of the associated primary winding and the bus bars to which said terminals are respectively connected, and (4) a spare tranformer having a primary winding with a pair of terminals; means for connecting said spare transformer to either of said buses when one of said thre single-phase transformers normally connected thereto is disconnected therefrom, comprising:

(a) six normally-open disconnect devices, the first two being electrically connected respectively between the terminals of said spare transformer and the first and third bus bars of one of said buses, the second two being electrically connected respectively between the terminals of one of the four transformers connectable to said one bus and the first and second of the main bus bars of said one bus, the third two being electrically connected respectively between the terminals of one of said four transformers connectable to said one bus and the second and third of the main bus bars of said one bus, (b) six additional normally-open disconnect devices, the first two being electrically connected respectively between the terminals of said spare transformer and the first and third bus bars of the other of said buses, the second two being electrically connected respectively between the terminals of one of the four transformers connectable to said other bus and the first and second of the bus bars of said other bus, the third two being electrically connected respectively between the terminals of one of said latter four transformers and the second and third of the bus bars of said other bus, (c) replacement of a disconnected transformer being effected by closing the two normally-open disconnect devices that, upon closing, connect their associated transformer to the same bus bars as said disconnected transformer was connected to.]

[11. The arrangement of claim 9 in combination with interlock means requiring:

(i) opening of the normally-closed disconnect device connected between a given one of said bus bars and the terminal connected thereto of the single phase transformer that is being replaced, as a requisite to (ii) closing of the normally-open disconnect device located between said given bus bar and the terminal of the replacement transformer connected thereto upon said closing.]

[12. The combination as defined in claim 9 in which:

(a) each of said normally-closed disconnect devices comprises a pair of spaced-apart terminal members and a removable disconnect link connected therebetween, said disconnect link being removable to effect opening of said normally-closed disconnect device, (b) and each of said normally-open disconnect devices comprises a pair of spaced-apart terminal members which are normally electrically isolated from each other but are adapted to receive therebetween a disconnect link taken from one of said normally-closed disconnect devices.]

13. [The combination as defined in claim 9 in which:] *In an electric power system that comprises: (1) a three-phase isolated-phase bus comprising first, second and third bus bars, (2) three single-phase transformers each having a primary winding with a pair of terminals, (3) a pair of normally-closed disconnect devices for each of said primary windings connecting said three primary windings in delta to said bus, the normally-closed disconnect devices of each pair being between the terminals of the associated primary windings and the bus bars to which their terminals are respectively connected and, (4) a spare transformer having a primary winding with a pair of terminals, means for connecting said spare transformer to said bus when one of said three single-phase tranformers is disconnected therefrom, comprising:*

*(a) six normally-open disconnect devices, the first two being electrically connected respectively between the terminals of said spare transformer and the first and third bus bars, the second two being electrically connected respectively between the terminals of one of said four transformers and the first and second of said bus bars, the third two being electrically connected respectively between the terminals of one of said four transformers and the second and third of said bus bars,*

*(b) replacement of a disconnected transformer being effected by closing the two normally-open disconnect devices that, upon closing, connect the associated transformer to the same bus bars as said disconnected transformer was connected to,*

[(a)] *(c)* each of said normally-closed disconnect devices comprises a pair of spaced apart terminal members and a removable disconnect link connected therebetween, said disconnect link being removable to effect opening of said normally-closed disconnect device,

[(b)] *(d)* each of said normally-open disconnect devices comprises a pair of spaced-apart terminal members which are normally electrically isolated from each other but are adapted to receive therebetween a disconnect link taken from one of said normally-closed disconnect devices,

[(c)] *(e)* a removable barrier is present between the terminal members of each of said normally-open disconnect devices when open, said barrier being located in spaced-apart relationship to said terminal members,

[(d)] *(f)* said barrier requiring removal as a prerequisite to connection of a disconnect link between said terminal members during a closing operation of said normally-open disconnect device, and

[(e)] *(g)* said removed barrier fitting into the normally-closed disconnect device that has been opened to provide a disconnect link for said closing operation, said barrier upon being included in said normally-closed, but then opened, disconnect device being spaced from the terminal members of said latter [dis-combination with:] *disconnect device.*

14. [The electric power system of claim 1, in combination with:] *In an electric power system that comprises: (1) a three-phase isolated phase bus comprising first, second, and third main bus bars, (2) three single-phase transformers each having a primary winding with a pair of terminals, (3) a pair of normally-closed disconnect devices for each of said primary windings connecting said three primary windings in delta to said bus, the normally-closed disconnect devices of each pair being between the terminals of the associated primary winding and the main bus bars to which said terminals are respectively connected and (4) a spare transformer having a primary winding with a pair of terminals; means for connecting said spare transformer to said bus as a replacement for any one of said three single-phase transformers, comprising:*

*(a) first and second auxiliary bus bars respectively connected to the opposite terminals of the primary winding of said spare transformer,*

*(b) three normally-open disconnect devices, the first being electrically connected between the first of said main bus bars and said first auxiliary bus bar, the second being electrically connected between the second of said main bus bars and said first auxiliary bus bar, and the third being electrically connected between the third of said main bus bars and said first auxiliary bus bar,*

*(c) three additional normally-open disconnect devices, the first additional normally-open disconnect device being electrically connected between the first of said main bus bars and said second auxiliary bus bar, the second additional normally-open disconnect device being electrically between the second of said main bus bars and said second auxiliary bus bar, the third additional normally-open disconnect device being electrically between the third of said main bus bars and said second auxiliary bus bar,*

*(d) replacement of any one of said single phase transformers by said spare being effected by opening the two normally-closed disconnect devices connecting said one single phase transformer to a given pair of main bus bars and closing the two normally-open disconnect devices that, upon closing, connect the spare to said given pair of main bus bars, and*

*(e) interlock means requiring (i) opening of the normally-closed disconnect device connected between a given one of said main bus bars and the terminal connected thereto of the single phase transformer that is being replaced, as a requisite to (ii) the closing of the normally-open disconnect device located between said given bus bar and the corresponding polarity terminal of the spare transformer connected thereto upon said closing, and in further combination with said electric power system as recited hereinabove:*

[(a)] *(f)* a plurality of housings at ground potential respectively surrounding each of said main bus bars,

[(b)] *(g)* cooling means for causing a flow of cooling fluid to flow through said housings along the surrounded bus bar toward any transformer connected to said bus bar,

[(c)] *(h)* the metal housing surrounding a given bus bar also having a portion surrounding the disconnect device connected thereto,

[(d)] *(i)* a removable barrier associated with each disconnect device when it is in open position for blocking the flow of gas past said open disconnect device toward the transformer to which said open disconnect device is connected, and

[(e)] *(j)* means requiring removal of the barrier associated with a given open disconnect device as a prerequisite to closing of said open disconnect device, thus permitting cooling gas to flow past a closed disconnect device without interference from the barrier.

[15. The combination as defined in claim 2 in which:

(a) each of said normally-closed disconnect devices comprises a pair of spaced-apart terminal members and a removable disconnect link connected therebetween, said disconnect link being removable to effect opening of said normally-closed disconnect device, (b) and each of said normally-open disconnect devices comprises a pair of spaced apart terminal members which are normally electrically isolated from each other but are adapted to receive therebetween a disconnect link taken from one of said normally-closed disconnect devices.]

[16. The combination as defined in claim 3 in which:

(a) each of said normally-closed disconnect devices comprises a pair of spaced-apart terminal members and a removable disconnect link connected therebetween, said disconnect link being removable to effect opening of said normally-closed disconnect device, (b) and each of said normally-open disconnect devices comprises a pair of spaced-apart terminal members which are normally electrically isolated from each other but are adapted to receive therebetween a disconnect link taken from one of said normally-closed disconnect devices.]

[17. The combination as defined in claim 2 in further combination with:

(a) a plurality of metal housings at ground potential respectively surrounding each of said main bus bars, (b) the metal housing surrounding a given bus bar also having a portion surrounding the disconnect devices connected thereto, (c) access openings in said housings respectively located opposite the disconnect devices therein, (d) covers for each of said access openings, (e) locks for each of said cover normally locking said cover on its associated opening, (f) a key for each of the locks of a cover opposite a normally-closed disconnect device, (g) key interlock means preventing the key used for unlocking a cover opposite a given normally-closed disconnect device from unlocking any of the covers of said normally-open disconnect devices except the cover of the particular normally-open disconnect device which, upon closing, connects a spare transformer to the same bus bar as the bus bar to which said given normally-closed disconnect device connected its transformer terminal.]

[18. The combination as defined in claim 3 in further combination with:

(a) a plurality of metal housings at ground potential respectively surrounding each of said main bus bars, (b) the metal housing surrounding a given bus bar also having a portion surrounding the disconnect devices connected thereto, (c) access openings in said housings respectively located opposite the disconnect devices therein, (d) covers for each of said access openings, (e) locks for each of said covers normally locking said cover on its associated opening, (f) a key for each of the locks of a cover opposite a normally-closed disconnect device, (g) key interlock means preventing the key used for unlocking a cover opposite a given normally-closed disconnect device from unlocking any of the covers of said normally-open disconnect devices except the cover of the particular normally-open disconnect device which, upon closing, connects a spare transformer to the same bus bar as the bus bar to which said given normally-closed disconnect device connected its tranformer terminal.]

[19. The combination as defined in claim 3 in further combination with:

(a) each of said normally-closed disconnect devices comprises a pair of spaced apart terminal members and a removable disconnect link connected therebetween, said disconnect link being removable to effect opening of said normally-closed disconnect device, (b) each of said normally-open disconnect devices comprises a pair of spaced-apart terminal members which are normally electrically isolated from each other but are adapted to receive therebetween a disconnect link taken from one of said normally-closed disconnect devices, (c) a removable barrier is present between the terminal members of each of said normally-open disconnect devices when open, said barrier being located in spaced-apart relationship to said terminal members, (d) said barrier requiring removal as a prerequisite to connection of a disconnect link between said terminal members during a closing operation of said normally-open disconnect device, and (e) said removed barrier fitting into the normally-closed disconnect device that has been opened to provide a disconnect link for said closing operation, said barrier upon being included in said normally-closed, but then-opened, disconnect device being spaced from the terminal members of said latter disconnect device.]

[20. The arrangement of claim 10 in combination with interlock means requiring:

(i) opening of the normally-closed disconnect device connected between a given one of said bus bars and the terminal connected thereto of the single phase transformer that is being replaced, as a requisite to (ii) closing of the normally-open disconnect device located between said given bus bar and the terminal of the replacement transformer connected thereto upon said closing.]

[21. The combination as defined in claim 10 in which:

(a) each of said normally-closed disconnect devices comprises a pair of a spaced-apart terminal members and a removable disconnect link connected therebetween, said disconnect link being removable to effect opening of said normally-closed disconnect device, (b) and each of said normally-open disconnect devices comprises a pair of spaced-apart terminal members which are normally electrically isolated from each other but are adapted to receive therebetween a disconnect link taken from one of said normally-closed disconnect devices.]

[22. The combination as defined in claim 10 in which:

(a) each of said normally-closed disconnect devices comprises a pair of spaced apart terminal members and a removable disconnect link connected therebetween, said disconnect link being removable to effect opening of said normally-closed disconnect device, (b) each of said normally-open disconnect devices comprises a pair of spaced-apart terminal members which are normally electrically isolated from each other but are adapted to receive therebetween a disconnect link taken from one of said normally-closed disconnect devices, (c) a removable barrier is present between the terminal members of each of said normally-open disconnect devices when open, said barrier being located in spaced-apart relationship to said terminal members, (d) said barrier requiring removal as a prerequisite to connection of a disconnect link between said terminal members during a closing operation of said normally-open disconnect device, and (e) said removed barrier fitting into the normally-closed disconnect device that has been opened to provide a disconnect link for said closing operation, said barrier upon being included in said normally-closed, but then opened, disconnect device being spaced from the terminal members of said latter disconnect device.]

[23. The electric power system of claim 2 in combination with:

(a) a plurality of housings at ground potential respectively surrounding each of said main bus bars, (b) bus cooling means for causing a flow of cooling fluid to flow through said housings along the surrounded bus bar toward any transformer connected to said bus bar, (c) the metal housing surrounding a given bus bar also having a portion surrounding the disconnect device connected thereto, (d) a removable barrier associated with each disconnect device when it is open position for blocking the flow of gas past said open disconnect device toward the transformer to which said open disconnect device is connected, and (e) means requiring removal of the barrier associated with a given open disconnect device as a prerequisite to closing of said open disconnect device, thus permitting cooling gas to flow past a closed disconnect device without interference from the barrier.]

24. [The electric power system of claim 9 in combination with:] *In an electric power system that comprises: (1) a three-phase isolated-phase bus comprising first, second and third bus bars, (2) three single-phase transformers each having a primary winding with a pair of terminals, (3) a pair of normally-closed disconnect devices for each of said primary windings connecting said three primary windings in delta to said bus, the normally-closed disconnect devices of each pair being between the terminals of the associated primary windings and the bus bars to which their terminals are respectively connected and, (4) a spare transformer having a primary winding with a pair of terminals, means for connecting said spare transformer to said bus when one of said three single-phase transformers is disconnected therefrom, comprising:*

*(a) six normally-open disconnect devices, the first two being electrically connected respectively between the terminals of said spare transformer and the first and third bus bars, the second two being electrically connected respectively between the terminals of one of said four transformers and the first and second of said bus bars, the third two being electrically connected respectively between the terminals of one of said four transformers and the second and third of said bus bars,*

*(b) replacement of a disconnected transformer being effected by closing the two normally-open disconnect devices that, upon closing, connect the associated transformer to the same bus bars as said disconnected transformer was connected to, and in further combination with said electric power system as recited hereinabove:*

[(a)] *(c)* a plurality of housings at ground potential respectively surrounding each of said main bus bars,

[(b)] *(d)* bus cooling means for causing a flow of cooling fluid to flow through said housings along the surrounded bus bar toward any transformer connected to said bus bar,

[(c)] *(e)* the metal housing surrounding a given bus bar also having a portion surrounding the disconnect device connected thereto,

[(d)] *(f)* a removable barrier associated with each disconnect device when it is in open position for blocking the flow of gas past said open disconnect device toward the transformer to which said open disconnect device is connected, and

[(e)] *(g)* means requiring removal of the barrier associated with a given open disconnect device as a prerequisite to closing of said open disconnect device, thus permitting cooling gas to flow past a closed disconnect device without interference from the barrier.

[25. The electrical power system of claim 10 in combination with:

(a) a plurality of housings at ground potential respectively surrounding each of said main bus bars, (b) bus cooling means for causing a flow of cooling liquid to flow through said housings along the surrounded bus bar toward any transformer connected to said bus bar, (c) the metal housing surrounding a given bus bar also having a portion surrounding the disconnect device connected thereto, (d) a removable barrier associated with each disconnect device when it is in open position for blocking the flow of gas past said open disconnect device toward the transformer to which said open disconnect device is connected, and (e) means requiring removal of the barrier associated with a given open disconnect device as a prerequisite to closing of said open disconnect device, thus permitting cooling gas to flow past a closed disconnect device without interference from the barrier.]

*26. In an electric power system that comprises (1) two three-phase isolated phase buses, each comprising first, second and third main bus bars, (2) six single-phase transformers, each having a primary winding with a pair of terminals, (3) a pair of normally-closed disconnect devices for each of said primary windings connecting three of said windings in delta to one of said buses and the other three of said primary windings in delta to the other of said buses, the normally-closed disconnect devices of each pair being between the terminals of the associated primary winding and the main bus bars to which said terminals are respectively connected and (4) a spare transformer having a primary winding with a pair of terminals; means for connecting said spare transformer to either of said buses as a replacement for any one of the three single-phase transformers normally connected thereto, comprising:*

*(a) first and second auxiliary bus bars respectively connected to the opposite terminals of the primary winding of said spare transformer,*

*(b) six normally-open disconnect devices, the first two of which are respectively electrically connected between said first auxiliary bus and the first of the main bus bars of said two buses, the second two of which are respectively electrically connected between said first auxiliary bus bar and the second of the main bus bars of said two buses, the third two of which are respectively electrically connected between said first auxiliary bus and the third of the main bus bars of said two buses,*

*(c) six additional normally-open disconnect devices, the first two of which are respectively electrically between said second auxiliary bus bar and the first of the main bus bars of said two buses, the second two of which are respectively electrically between said second auxiliary bus bar and the second of the main bus bars of said two buses, the third two of which are respectively electrically between said second auxiliary bus bar and the third of the main bus bars of said two buses,*

*(d) replacement of any one of said single-phase transformers by said spare transformer being effected by opening the two normally-closed disconnect devices connecting the primary winding of said one single-phase transformer to a given pair of main bus bars and closing the two normally-open disconnect devices that, upon closing, connect the primary winding of said spare transformer to said given pair of main bus bars,*

*(e) a third three phase bus comprising first, second and third main bus bars,*

*(f) three additional single-phase transformers normally having their primary windings connected in delta to said third three-phase bus,*

*(g) means for connecting the single-phase transformer of said power system located adjacent said third three-phase bus to said third three-phase bus as a replacement for any one of the additional single phase transformers normally connected to said third three-phase bus, comprising:*

*(i) three further normally-open disconnect devices respectively connected between one terminal of said adjacent transformer and said first, second and third main bus bars of said third bus,*

*(ii) three still further normally-open disconnect devices respectively connected between the opposite terminal of said adjacent transformer and said first, second and third main bus bars of said third bus,*

*(iii) a pair of normally-closed disconnect devices for each of the single-phase transformers normally connected to said third bus respectively connected between terminals of said latter single phase transformer and the main bus bars to which said latter single phase transformer is connected,*

*(iv) replacement of said latter single-phase transformer by said adjacent transformer being effected by opening the two normally-closed disconnect devices connecting said latter single-phase transformer to a given pair of main bus bars in said third bus and closing the two normally-open disconnect devices of those recited in (i) and (ii) that, upon closing, connect said spare transformer to said given pair of main bus bars in said third bus.*

*27. In an electric power system that comprises (1) two three-phase isolated phase buses, each comprising first, second and third main bus bars, (2) six single-phase transformers, each having a primary winding with a pair of terminals, (3) a pair of normally-closed disconnect devices for each of said primary windings connecting three of said windings in delta to one of said buses and the other three of said primary windings in delta to the other of said buses, the normally-closed disconnect devices of each pair being between the terminals of the associated primary winding and the main bus bars to which said terminals are respectively connected and (4) a spare transformer having a primary winding with a pair of terminals; means for connecting said spare transformer to either of said buses as a replacement for any one of the three single-phase transformers normally connected thereto, comprising:*

*(a) first and second auxiliary bus bars respectively connected to the opposite terminals of the primary winding of said spare transformer,*

*(b) six normally-open disconnect devices, the first two of which are respectively electrically connected between said first auxiliary bus and the first of the main bus bars of said two buses, the second two of which are respectively electrically connected between said first auxiliary bus bar and the second of the main bus bars of said two buses, the third two of which are respectively electrically connected between said first auxiliary bus and the third of the main bus bars of said two buses,*

*(c) six additional normally-open disconnect devices, the first two of which are respectively electrically between said second auxiliary bus bar and the first of the main bus bars of said two buses, the second two of which are respectively electrically between said second auxiliary bus bar and the second of the main bus bars of said two buses, the third two of which are respectively electrically between said second auxiliary bus bar and the third of the main bus bars of said two buses,*

*(d) replacement of any one of said single-phase transformers by said spare transformer being effected by opening the two normally-closed disconnect devices connecting the primary winding of said one single-phase transformer to a given pair of main bus bars and closing the two normally-open disconnect devices that, upon closing, connect the primary winding of said spare transformer to said given pair of main bus bars,*

*(e) a plurality of metal housings at ground potential respectively surrounding each of said main bus bars,*

*(f) the metal housing surrounding a given bus bar also having a portion surrounding the disconnect devices connected thereto,*

*(g) access openings in said housings respectively located opposite the disconnect devices therein,*

*(h) covers for each of said access openings,*

*(i) locks for each of said covers normally locking said cover on its associated opening,*

*(j) a key for each of the locks of a cover opposite a normally-closed disconnect device,*

*(k) key interlock means preventing the key used for unlocking a cover opposite a given normally-closed disconnect device from unlocking any of the covers of said normally-open disconnect devices except the cover of the particular normally-open disconnect device which, upon closing, connects a spare transformer to the same bus bar as the bus bar to which said given normally-closed disconnect device connected its transformer terminal.*

*28. In an electric power system that comprises (1) two three-phase isolated phase buses, each comprising first, second and third main bus bars, (2) six single-phase transformers, each having a primary winding with a pair of terminals, (3) a pair of normally-closed disconnect devices for each of said primary windings connecting three of said windings in delta to one of said buses and the other three of said primary windings in delta to the other of said buses, the normally-closed disconnect devices of each pair being between the terminals of the associated primary winding and the main bus bars to which said terminals are respectively connected and (4) a spare transformer having a primary winding with a pair of terminals; means for connecting said spare transformer to either of said buses as a replacement for any one of the three single-phase transformers normally connected thereto, comprising:*

*(a) first and second auxiliary bus bars respectively connected to the opposite terminals of the primary winding of said spare transformer,*

*(b) six normally-open disconnect devices, the first two of which are respectively electrically connected between said first auxiliary bus and the first of the main bus bars of said two buses, the second two of which are respectively electrically connected between said first auxiliary bus bar and the second of the main bus bars of said two buses, the third two of which are respectively electrically connected between said first auxiliary bus and the third of the main bus bars of said two buses,*

*(c) six additional normally-open disconnect devices, the first two of which are respectively electrically between said second auxiliary bus bar and the first of the main bus bars of said two buses, the second two of which are respectively electrically between said second auxiliary bus bar and the second of the main bus bars of said two buses, the third two of which are respectively electrically between said second auxiliary bus bar and the third of the main bus bars of said two buses,*

*(d) replacement of any one of said single-phase transformers by said spare transformer being effected by opening the two normally-closed disconnect devices connecting the primary winding of said one single-phase transformer to a given pair of main bus bars and closing the two normally-open disconnect devices that, upon closing, connect the primary winding of said spare transformer to said given pair of main bus bars,*

*(e) interlock means requiring: (i) opening of the normally-closed disconnect device connected between a given one of said main bus bars and the terminal connected thereto of the single phase transformer that is being replaced, as a requisite to (ii) closing of the normally-open disconnect device located between said given main bus bar and the corresponding polarity terminal of the spare transformer connected thereto upon said closing,*

*(f) a plurality of metal housings at ground potential respectively surrounding each of said main bus bars,*

*(g) the metal housing surrounding a given bus bar also having a portion surrounding the disconnect devices connected thereto,*

*(h) access openings in said housing respectively located opposite the disconnect devices therein,*

*(i) covers for each of said access openings,*

*(j) locks for each of said covers normally locking said cover on its associated opening,*

*(k) a key for each of the locks of a cover opposite a normally-closed disconnect device,*

*(l) key interlock means preventing the key used for unlocking a cover opposite a given normally-closed disconnect device from unlocking any of the covers of said normally-open disconnect devices except the cover of the particular normally-open disconnect device which, upon closing, connects a spare transformer to the same bus bar as the bus bar to which said given normally-closed disconnect device connected its transformer terminal.*

*29. In an electric power system that comprises (1) two three-phase isolated phase buses, each comprising first, second and third main bus bars, (2) six single-phase transformers, each having a primary winding with a pair of terminals, (3) a pair of normally-closed disconnect devices for each of said primary windings connecting three of said windings in delta to one of said buses and the other three of said primary windings in delta to the other of said buses, the normally-closed disconnect devices of each pair being between the terminals of the associated primary winding and the main bus bars to which said terminals are respectively connected and (4) a spare transformer having a primary winding with a pair of terminals; means for connecting said spare transformer to either of said buses as a replacement for any one of the three single-phase transformers normally connected thereto, comprising:*

*(a) first and second auxiliary bus bars respectively connected to the opposite terminals of the primary winding of said spare transformer,*

*(b) six normally-open disconnect devices, the first two of which are respectively electrically connected between said first auxiliary bus and the first of the main bus bars of said two buses, the second two of which are respectively electrically connected between said first auxiliary bus bar and the second of the main bus bars of said two buses, the third two of which are respectively electrically connected between said first auxiliary bus and the third of the main bus bars of said two buses,*

*(c) six additional normally-open disconnect devices, the first two of which are respectively electrically between said second auxiliary bus bar and the first of the main bus bars of said two buses, the second two of which are respectively electrically between said second auxiliary bus bar and the second of the main bus bars of said two buses, the third two of which are respectively electrically between said second auxiliary bus bar and the third of the main bus bars of said two buses,*

*(d) replacement of any one of said single-phase transformers by said spare transformer being effected by opening the two normally-closed disconnect devices connecting the primary winding of said one single-phase transformer to a given pair of main bus bars and closing the two normally-open disconnect devices that, upon closing, connect the primary winding of said spare transformer to said given pair of main bus bars,*

*(e) interlock means requiring: (i) opening of the normally-closed disconnect device connected between a given one of said main bus bars and the terminal connected thereto of the single phase transformer that is being replaced, as a requisite to (ii) closing of the normally-open disconnect device located between said given main bus bar and the corresponding polarity terminal of the spare transformer connected thereto upon said closing,*

*(f) each of said normally-closed disconnect devices comprising a pair of spaced apart terminal members and a removable disconnect link connected therebetween, said disconnect link being removable to effect opening of said normally-closed disconnect device,*

*(g) each of said normally-open disconnect devices comprising a pair of spaced-apart terminal members which are normally electrically isolated from each other but are adapted to receive therebetween a disconnect link taken from one of said normally-closed disconnect devices,*

*(h) a removable barrier present between the terminal members of each of said normally-open disconnect devices when open, said barrier being located in spaced-apart relationship to said terminal members,*

*(i) said barrier requiring removal as a prerequisite to connection of a disconnect link between said terminal members during a closing operation of said normally-open disconnect device, and*

*(j) said removed barrier fitting into the normally-closed disconnect device that has been opened to provide a disconnect link for said closing operation, said barrier upon being included in said normally-closed, but then-opened, disconnect device being spaced from the terminal members of said latter disconnect device.*

*30. In an electric power system that comprises (1) two three-phase isolated phase buses, each comprising first, second, and third bus bars, (2) six single-phase transformers, each having a primary winding with a pair of terminals, (3) a pair of normally-closed disconnect devices for each of said primary windings connecting three of said windings in delta to one of said buses and the other three of said primary windings in delta to the other of said buses, the normally-closed disconnect devices of each pair being between the terminals of the associated primary winding and the bus bars to which said terminals are respectively connected, and (4) a spare transformer having a primary winding with a pair of terminals; means for connecting said spare transformer to either of said buses when one of said three single-phase transformers normally connected thereto is disconnected therefrom, comprising:*

*(a) six normally-open disconnect devices, the first two being electrically connected respectively between the terminals of said spare transformer and the first and third bus bars of one of said buses, the second two being electrically connected respectively between the terminals of one of the four transformers connectable to said one bus and the first and second of the main bus bars of said one bus, the third two being electrically connected respectively between the terminals of one of said four transformers connectable to said one bus and the second and third of the main bus bars of said one bus,*

*(b) six additional normally-open disconnect devices, the first two being electrically connected respectively between the terminals of said spare transformer and the first and third bus bars of the other of said buses, the second two being electrically connected respectively between the terminals of one of the four transformers connectable to said other bus and the first and second of the bus bars of said other bus, the third two being electrically connected respectively between the terminals of one of said latter four transformers and the second and third of the bus bars of said other bus,*

*(c) replacement of a disconnected transformer being effected by closing the two normally-open disconnect devices that, upon closing, connect their associated transformer to the same bus bars as said disconnected transformer was connected to,*

*(d) each of said normally-closed disconnect devices comprising a pair of spaced apart terminal members and a removable disconnect link connected therebetween, said disconnect link being removable to effect opening of said normally-closed disconnect device,*

*(e) each of said normally-open disconnect devices comprising a pair of spaced-apart terminal members which are normally electrically isolated from each other but are adapted to receive therebetween a disconnect link taken from one of said normally-closed disconnect devices,*

*(f) a removable barrier present between the terminal members of each of said normally-open disconnect devices when open, said barrier being located in spaced-apart relationship to said terminal members,*

*(g) said barrier requiring removal as a prerequisite to connection of a disconnect link between said terminal members during a closing operation of said normally-open disconnect device, and*

*(h) said removed barrier fitting into the normally-closed disconnect device that has been opened to provide a disconnect link for said closing operation, said barrier upon being included in said normally-closed, but then opened, disconnect device being spaced from the terminal members of said latter disconnect device.*

*31. In an electric power system that comprises (1) two three-phase isolated phase buses, each comprising first, second and third main bus bars, (2) six single-phase transformers, each having a primary winding with a pair of terminals, (3) a pair of normally-closed disconnect devices*

*for each of said primary windings connecting three of said windings in delta to one of said buses and the other three of said primary windings in delta to the other of said buses, the normally-closed disconnect devices of each pair being between the terminals of the associated primary winding and the main bus bars to which said terminals are respectively connected and (4) a spare transformer having a primary winding with a pair of terminals; means for connecting said spare transformer to either of said buses as a replacement for any one of the three single-phase transformers normally connected thereto, comprising:*

*(a) first and second auxiliary bus bars respectively connected to the opposite terminals of the primary winding of said spare transformer,*

*(b) six normally-open disconnect devices, the first two of which are respectively electrically connected between said first auxiliary bus and the first of the main bus bars of said two buses, the second two of which are respectively electrically connected between said first auxiliary bus bar and the second of the main bus bars of said two buses, the third two of which are respectively electrically connected between said first auxiliary bus and the third of the main bus bars of said two buses,*

*(c) six additional normally-open disconnect devices, the first two of which are respectively electrically between said second auxiliary bus bar and the first of the main bus bars of said two buses, the second two of which are respectively electrically between said second auxiliary bus bar and the second of the main bus bars of said two buses, the third two of which are respectively electrically between said second auxiliary bus bar and the third of the main bus bars of said two buses,*

*(d) replacement of any one of said single-phase transformers by said spare transformer being effected by opening the two normally-closed disconnect devices connecting the primary winding of said one single-phase transformer to a given pair of main bus bars and closing the two normally-open disconnect devices that, upon closing, connect the primary winding of said spare transformer to said given pair of main bus bars,*

*(e) a plurality of housings at ground potential respectively surrounding each of said main bus bars,*

*(f) bus cooling means for causing a flow of cooling fluid to flow through said housings along the surrounded bus bar toward any transformer connected to said bus bar,*

*(g) the metal housing surrounding a given bus bar also having a portion surrounding the disconnect device connected thereto,*

*(h) a removable barrier associated with each disconnect device when it is open position for blocking the flow of gas past said open disconnect device toward the transformer to which said open disconnect device is connected, and*

*(i) means requiring removal of the barrier associated with a given open disconnect device as a prerequisite to closing of said open disconnect device, thus permitting cooling gas to flow past a closed disconnect device without interference from the barrier.*

*32. In an electric power system that comprises (1) two three-phase isolated phase buses, each comprising first, second, and third bus bars, (2) six single-phase transformers, each having a primary winding with a pair of terminals, (3) a pair of normally-closed disconnect devices for each of said primary windings connecting three of said windings in delta to one of said buses and the other three of said primary windings in delta to the other of said buses, the normally-closed disconnect devices of each pair being between the terminals of the associated primary winding and the bus bars to which said terminals are respectively connected, and (4) a spare transformer having a primary winding with a pair of terminals; means for connecting said spare transformer to either of said buses when one of said three single-phase transformers normally connected thereto is disconnected therefrom, comprising:*

*(a) six normally-open disconnect devices, the first two being electrically connected respectively between the terminals of said spare transformer and the first and third bus bars of one of said buses, the second two being electrically connected respectively between the terminals of one of the four transformers connectable to said one bus and the first and second of the main bus bars of said one bus, the third two being electrically connected respectively between the terminals of one of said four transformers connectable to said one bus and the second and third of the main bus bars of said one bus,*

*(b) six additional normally-open disconnect devices, the first two being electrically connected respectively between the terminals of said spare transformer and the first and third bus bars of the other of said buses, the second two being electrically connected respectively between the terminals of one of the four transformers connectable to said other bus and the first and second of the bus bars of said other bus, the third two being electrically connected respectively between the terminals of one of said latter four transformers and the second and third of the bus bars of said other bus,*

*(c) replacement of a disconnected transformer being effected by closing the two normally-open disconnect devices that, upon closing, connect their associated transformer to the same bus bars as said disconnected transformer was connected to,*

*(d) a plurality of housings at ground potential respectively surrounding each of said main bus bars,*

*(e) bus cooling means for causing a flow of cooling fluid to flow through said housings along the surrounded bus bar toward any transformer connected to said bus bar,*

*(f) the metal housing surrounding a given bus bar also having a portion surrounding the disconnect device connected thereto,*

*(g) a removable barrier associated with each disconnect device when it is in open position for blocking the flow of gas past said open disconnect device toward the transformer to which said open disconnect device is connected, and*

*(h) means requiring removal of the barrier associated with a given open disconnect device as a prerequisite to closing of said open disconnect device, thus permitting cooling gas to flow past a closed disconnect device without interference from the barrier.*

* * * * *